US012301607B2

(12) United States Patent
Connors et al.

(10) Patent No.: US 12,301,607 B2
(45) Date of Patent: May 13, 2025

(54) SYSTEMS AND METHODS FOR PLATFORM CYBER VULNERABILITY EVALUATION

(71) Applicants: Charles Connors, Santee, CA (US); Geoffrey R. Janjua, Ogden, UT (US); Kenneth F. McKinney, San Diego, CA (US); Victoria Nagorski, San Diego, CA (US); Charles Negus, San Diego, CA (US); David Squiller, San Diego, CA (US); Lyndsay Walker, San Diego, CA (US); Matthew Ward, Temecula, CA (US); Kenneth R. Weidele, San Diego, CA (US)

(72) Inventors: Charles Connors, Santee, CA (US); Geoffrey R. Janjua, Ogden, UT (US); Kenneth F. McKinney, San Diego, CA (US); Victoria Nagorski, San Diego, CA (US); Charles Negus, San Diego, CA (US); David Squiller, San Diego, CA (US); Lyndsay Walker, San Diego, CA (US); Matthew Ward, Temecula, CA (US); Kenneth R. Weidele, San Diego, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 542 days.

(21) Appl. No.: 17/674,588

(22) Filed: Feb. 17, 2022

(65) Prior Publication Data

US 2023/0262086 A1  Aug. 17, 2023

(51) Int. Cl.
*H04L 29/06* (2006.01)
*H04L 9/40* (2022.01)
(Continued)

(52) U.S. Cl.
CPC .......... *H04L 63/1433* (2013.01); *H04L 41/12* (2013.01); *H04L 41/16* (2013.01); *H04L 63/1441* (2013.01)

(58) Field of Classification Search
CPC ..... H04L 63/1433; H04L 41/12; H04L 41/16; H04L 63/1441; H04L 67/303
See application file for complete search history.

(56) References Cited

U.S. PATENT DOCUMENTS

2007/0067847 A1* 3/2007 Wiemer ................ G06F 21/577
 726/25
2014/0337471 A1* 11/2014 Yasuda ................. G06F 9/5072
 709/217

(Continued)

OTHER PUBLICATIONS

IRPR (International Preliminary Report on Patentability) mailed Aug. 20, 2024.

*Primary Examiner* — Yogesh Paliwal
(74) *Attorney, Agent, or Firm* — Tarolli, Sundheim, Covell & Tummino LLP

(57) ABSTRACT

In an example, a component analyzer can compute a respective part score for each part of the platform based on a part property table, and a respective connection score for each connection of the platform based on a connection property table. The component analyzer can provide the respective part and connection scores as score data to an architecture modeling engine to compute a probability model based on the score data and an architecture model. The probability model can include a part probability value and a connection probability value, and the architecture model can characterize a target architecture of the platform. A survivability analysis engine can evaluate the probability model and the architecture model to determine a likelihood that one or more potential cyber-attacks on the platform based on the (Continued)

target architecture are successful or unsuccessful in compromising at least one part of the platform.

20 Claims, 10 Drawing Sheets

(51) Int. Cl.
    *H04L 41/12*     (2022.01)
    *H04L 41/16*     (2022.01)

(56) References Cited

U.S. PATENT DOCUMENTS

2020/0358804 A1    11/2020    Crabtree et al.
2021/0352100 A1*  11/2021    Barai .................. H04L 63/1416

* cited by examiner

400 ⟶

|  | A | B | C |
|---|---|---|---|
| PART PROPERTY 1 | X |  | X |
| PART PROPERTY 2 |  | X | X |
| SOURCE PROPERTY 1 | X |  |  |
| SOURCE PROPERTY 2 |  |  | X |
| TARGET PROPERTY 1 |  |  | X |
| TARGET PROPERTY 2 |  | X |  |

|  | A::B | A::C |
|---|---|---|
| CONNECTION PROPERTY 1 | X | X |
| CONNECTION PROPERTY 2 | X | X |
| CONNECTION PROPERTY 3 | X |  |

|  | BUS1 |
|---|---|
| BUS PROPERTY 1 |  |
| BUS PROPERTY 2 | X |
| BUS PROPERTY 3 | X |

| | SCORE |
|---|---|
| A | -1.2 |
| B | 0.38 |
| C | 0.47 |
| A::B | 2.1 |
| A::C | -0.1 |
| BUS 1 | 0.59 |

900 →

|  | A | B | C | BUS1 | END 1 | END 2 |
|---|---|---|---|---|---|---|
| A | 0% | 75% | 1% | 12% | 0% | 12% |
| B | 0% | 0% | 0% | 0% | 33% | 67% |
| C | 2% | 0% | 0% | 18% | 0% | 80% |
| BUS1 | 33% | 33% | 33% | 0% | 0% | 1% |
| START | 100% | 0% | 0% | 0% | 0% | 0% |

|  | TOOL 1 | TOOL 2 |
|---|---|---|
| A | 5% | 0% |
| B | 52% | 16% |
| C | 50% | 79% |
| BUS1 | 44% | 13% |

|  | TOOL 1 | TOOL 2 |
|---|---|---|
| A::B | 32% | 20% |
| A::C | 31% | 69% |
| A::BUS 1 | 29% | 2% |
| B::BUS 1 | 67% | 1% |
| C::BUS 1 | 74% | 81% |

FIG. 11

SYSTEMS AND METHODS FOR PLATFORM CYBER VULNERABILITY EVALUATION

TECHNICAL FIELD

This disclosure relates to systems and methods for cyber vulnerability evaluation of a platform.

BACKGROUND

A cyberattack is any offensive maneuver that targets computer information systems, computer networks, infrastructures, or personal computer devices. An attacker is a person or process that attempts to access data, functions, or other restricted areas of the system without authorization, potentially with malicious intent. Depending on a context, cyberattacks can be part of cyberwarfare or cyberterrorism. A cyberattack can be employed by sovereign states, individuals, groups, society, or organizations, and it may originate from an anonymous source. A product that facilitates a cyberattack is sometimes called a cyber weapon. A cyberattack may steal, alter, or destroy a specified target by hacking into a susceptible system. Cyberattacks can range from installing spyware on a personal computer to attempting to destroy the infrastructure of entire nations.

A vulnerability assessment is a process of identifying, quantifying, and prioritizing (or ranking) vulnerabilities in a system. A penetration test, colloquially known as a pen test or ethical hacking, is an authorized simulated cyberattack on a computer system, performed to evaluate a security of the computer system. The penetration test is performed to identify weaknesses (also referred to as vulnerabilities), including the potential for unauthorized parties to gain access to the system's features and data, as well as strengths, enabling a full risk assessment to be completed. The process typically identifies the target systems and a particular goal, then reviews available information and undertakes various means to attain that goal.

SUMMARY

In an example, a system can include memory to store machine-readable instructions. The system can include one or more processors to access the memory and execute the machine-readable instructions. The machine-readable instructions can include a component analyzer programmed to compute a respective part score for each part of the platform based on the part property table, and a respective connection score for each connection of the platform based on the connection property table. The component analyzer can be programmed to provide the respective part and connection scores as score data. The machine-readable instructions can further include an architecture modeling engine that can be programmed to compute a probability model based on the score data and an architecture model. The probability model can include a part probability value and a connection probability value, and the architecture model can characterize a target architecture of the platform. The machine-readable instructions can further include a survivability analysis engine that can be programmed to evaluate the probability model and the architecture model to determine a likelihood that one or more potential cyber-attacks on the platform based on the target architecture are successful or unsuccessful in compromising at least one part of the platform.

In yet another example, a computer implemented method can include generating a part property table identifying respective part properties for one or more parts of a platform based on part survey data. The property table can include respective binary and weight values associated with one of the one or more parts. The computer implemented method can further include generating a connection property table identifying respective connection properties for one or more connections of the platform based on connection survey data. The connection property table can include respective binary and weights values associated with one of the one or more connections. The computer implemented method can further include computing a part score for each part of the platform based on the respective binary and weight values for a respective part of the one or more parts from the part property table, computing a connection score for each connection of the platform based on the respective binary and weight values for a respective connection of the one or more connections from the connection property table and computing a probability model based on the part and connection scores and an architecture model. The probability model can include a part probability value and a connection probability value, and the architecture model can characterize a target architecture of the platform. The computer implemented method can further include evaluating the probability model and the architecture model to determine a likelihood that one or more potential cyber-attacks on the platform based on the target architecture are successful or unsuccessful in compromising at least one part of the platform.

In a further example, a non-transitory machine-readable medium can include machine-readable instructions that can include a component analyzer that can include a score calculator programmed to compute for each part and connection of a platform a respective part and connection score and architecture modeling engine. The architecture modeling engine can include a probability score calculator that can be programmed to compute a probability model comprising a part probability value and a connection probability value for a corresponding part and connection of the platform based on the respective part and connection score, and an architecture modeling module programmed to provide an architecture model with start and end conditions indicative respectively of where at least one potential cyber-attack can begin and end with respect to the platform based on architecture description data characterizing a target architecture of the platform and start and end condition data. The machine-readable instructions can include a survivability analysis engine that can be programmed to evaluate the probability model and the architecture model to determine a likelihood that one or more potential cyber-attacks are successful or unsuccessful in compromising the at least one part of the platform.

BRIEF DESCRIPTION OF THE DRAWINGS

FIG. 4 is an example of a part property table.

FIG. 5 is an example of a connection property table.

FIG. 6 is an example of a bus property table.

FIG. 9 is an example of a partial probability table.

FIG. 10 is an example of a survivability table.

FIG. 11 is an example of another survivability table.

DETAILED DESCRIPTION

Figure 1:
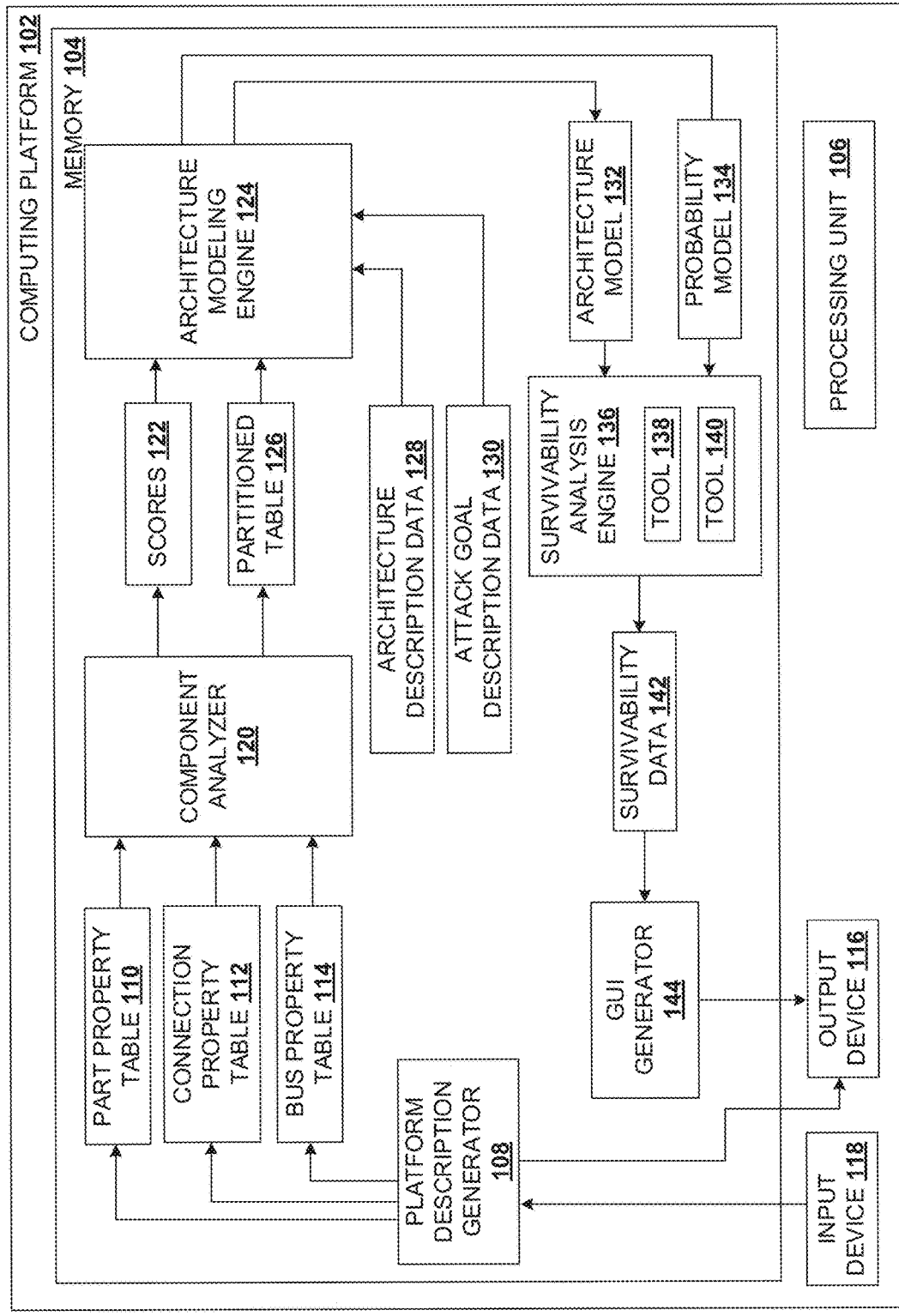
FIG. 1 illustrates an example of a system for evaluating a platform for cyber vulnerabilities.

Existing approaches for measuring platform security involve manually filling out red-yellow-green risk cubes and solely relying on the experience of subject matter experts (SMEs). These methodologies subjectively measure risk and do not lend themselves to further analysis such as worst-case attack vectors. Moreover, current methodologies for cyber-physical attacks focus on detection, penetration testing, threat analysis, and vulnerability scoring. These techniques focus on a real-time detection of an attack after a platform is designed and implemented (e.g., employed, manufactured, etc.). Real-time detection systems of a cyber-attack or threat rely on machine learning or other methods to recognize patterns within normal network traffic so such systems can flag an administrator to unusual cyber behavior. Penetration testing is similar to real-time detection but acts as a stress test on a system. Whereas this is an important tool for finding vulnerabilities, it is a separate capability that also occurs after the design and implementation of the platform.

Threat analysis generally is based on software that attempts to identify a weakness of a system. For robust software applications, such software is limited to finding vulnerabilities within other software packages. There exist a number of methodologies for modeling and identifying security threats, such as spoofing, tampering, repudiation, information disclosure, denial of service, and elevation privilege (STRIDE), process for attack simulation and threat analysis (PASTA), or Trike, which attempt to root out cyber-attack vectors by focusing on data such as software protocols. These have been made into tools such as Microsoft Threat Modeling Tool, but are limited to reducing software vulnerabilities within computer applications.

Systems and methods are described herein for identifying and ranking cyber vulnerabilities to a platform based on an architecture of the platform. In contrast to existing tools and approaches, the systems and methods described herein can be used to predict vulnerabilities and prevent attacks during a design phase of the platform, or before such a phase of the platform is completed. The systems and methods described herein can assess non-kinetic cyber system survivability to improve a cyber security posture of the platform. For example, the systems and methods described herein enable a user to define one or more systems or sub-systems (referred to herein in some examples as "parts" or "components") of the platform via a physical architecture and SME-identified attributes. The systems and methods described can use this information to score one or more parts of the platform by risk. These scores enable further analysis on worst-case attack vectors, cost-benefit analysis, and a metric of overall system survivability. The systems and methods described herein provide an objective measure of survivability, allow for identification of cyber weaknesses, and comparisons to be implemented for a purpose of informing security design, justifying integration costs, and saving time while budgeting.

According to the examples described herein, components can be factually defined for modeling a physical architecture of the platform, the modeled physical architecture of the platform can be simulated to simulate effects of cyber-attack vectors on the platform, and enable cyber threats to the platform to be analyzed during or before a design phase of the platform rather than relying on real-time monitoring software. Thus, the systems and methods described herein can be used to identify or catch cyber vulnerabilities in the design phase, which reduces analysis time by replacing a time-consuming manual process with an automated process, reduces testing time by identifying components or interfaces that need more scrutiny, saves budgeting time by providing reliable justification, and saves mitigation time through an exploration of alternatives physical architectures for the platform.

FIG. 1 illustrates an example of a system 100 for evaluating a platform for cyber vulnerabilities. The term "platform" as used herein can refer to a system, a device, a vehicle (e.g., a ground, an aerial, or a watercraft), an information machine (e.g., a computer, a telephone system, etc.), or any type of technology that can be subject to a cyber-attack. By way of example, the platform may be an unmanned aircraft system (UAS). In some examples, referred to herein as a "given example," the platform is an aircraft system that can include multiple sub-systems. In some instances, a sub-system may include one or more line replaceable units (LRUs). LRUs are modular components of an aircraft. In some instances, one or more LRUs may include a line maintenance part (LMP). In the given example, the aircraft system may be accessed (e.g., by the unauthorized user) using a WiFi interface (e.g., an embedded modem), a Bluetooth interface (e.g., a radio), a Universal Serial Bus (USB) interface, or a data interface (e.g., an on-board data connector (OBD) connector). Generally, an entry point into the platform is any physical device that the unauthorized user (e.g., a cyber attacker) can exploit to enter the platform. In the given example, for instance, the unauthorized user can enter via a computer plugged into the data interface, a USB plugged into the radio, wirelessly over Bluetooth via the radio, or wirelessly over WiFi via the embedded modem.

In some examples, the unauthorized user once in the system may use a communications network of the aircraft system to access sub-systems of the aircraft. The communications networks may include any number of networks, switches, routers, etc. over which data can be communicated (e.g., between sub-systems of the aircraft system). The communications network may include a controller area network (CAN) bus, which can function as a central network through which components of the aircraft system can communicate with each other. The unauthorized user may inject false data or malicious code (e.g., a virus) into the communications network and target a respective sub-system of the aircraft system. For example, the unauthorized user can attach a device (e.g., a USB device) with the false data to an avionics CAN bus to inject the false data to alter engine telemetry readings, compass and altitude data, altitude, airspeeds, and angle of attack.

In the given example, the aircraft system includes an aircraft brake system, a steering control system, and an engine control system that is coupled to the communications networks. For clarity and brevity, the given example is described herein with respect to the unauthorized user potentially gaining access to or attacking one of the aircraft brake, steering control, and engine control systems. However, it is to be understood that the unauthorized user may gain access to other sub-systems of the aircraft system (e.g., communications, navigation, etc.) not described herein. Thus, the examples herein are equally applicable for identifying cyber vulnerabilities (or weaknesses) of other sub-systems of the aircraft system.

Continuing with the example of FIG. 1, the system 100 includes a computing platform 102. The computing platform 102 can be configured to model an architecture of the platform. Thus, the computing platform 102 can model (e.g., via one or more logical models) a physical architecture of the platform. The logical models or views may consist of conceptual design drawings, schematics, and block diagrams that define a platform's form and arrangement of system components and associated interfaces. In the given example, the computing platform 102 can be configured to define a physical architecture of the aircraft system, such as hardware access points, the communications network, and aircraft brake, steering control, and engine control systems.

The computing platform 102 can include memory 104 for storing machine readable instructions and data and a processing unit 106 for accessing the memory 104 and executing the machine-readable instructions. The memory 104 represents a non-transitory machine-readable memory (or other medium), such as random access memory (RAM), a solid state drive, a hard disk drive, or a combination thereof. The processing unit 106 can be implemented as one or more processor cores. The computing platform 102 could be implemented in a computing cloud. In such a situation, features of the computing platform 102, such as the processing unit 106 and the memory 104 could be representative of a single instance of hardware or multiple instances of hardware with applications executing across the multiple instances (e.g., distributed) of hardware (e.g., computers, routers, memory, processors, or a combination thereof). Alternatively, the computing platform 102 could be implemented on a single dedicated server or workstation.

The processing unit 106 can access the memory 104 to execute a platform description generator 108. The platform description generator 108 can generate a part property table 110 identifying respective part properties for one or more parts of the platform, a connection property table 112 identifying respective connection properties for respective connections of the platform, and a bus property table 114 identifying respective bus properties for one or more buses of the platform. Because all connections on a same bus share similar properties, at least some of the bus properties in the bus property table 114 can be similar to the part and connection properties. For example, the platform description generator 108 can decompose the platform into a fact-based inquiry which can consist of entering information characterizing the platform as well as answering a number of cyber security questions about each component or part and interface within the platform. The survey questions can be on SME identified attributes, which along, with the information characterizing the architecture of the platform, allows an underlying model to aggregate data into useful information about the overall platform.

By way of example, the respective part properties for one more parts of the platform can include general part properties, source properties, and target properties. In the given example, the general part properties for a respective part can indicate whether the respective part is commercially accessible, custom built, had code recently patched, is software encrypted at rest, has write-protected memory, is capable of in-band cyber detection, and/or is capable of out-of-band cyber detection. The source properties for the respective part can indicate whether the respective part is radio-frequency (RF) enabled, supports removable media, requires a direct connection for access, and/or requires physical access. The target properties for the respective part can indicate whether the respective part is safety-critical, flight-critical, and/or stores data files. In the given example, the connection properties for one or more connections in the platform can indicate whether a respective connection is based on a published open specification, is based on a government-controlled specification, employs a custom protocol, is a serial connection, is a discrete connection, is a non-data connection, employs encryption (e.g., via message hashing), and/or uses cryptographic authentication. In the given example, the bus properties for a respective bus can indicate whether the respective bus employs a master controller or is without a master controller.

For example, the platform description generator 108 can query a user via an output device 116 (e.g., a display) with a part survey, a connection survey, and a bus survey. In some examples, one or more surveys described herein can be implemented as a checkbox survey. The party survey may include one or more fields for inputting one or more parts of the platform. In some instances, the part survey can identify different part properties for the respective part that can be assigned by the user based on user input at an input device 118 (e.g., a mouse, a keyboard, etc.). The connection survey may include one or more fields for inputting one or more connections of the platform. In some instances, the connection survey can identify different connection properties for the respective connection that can be assigned by the user based on the user input at the input device 118. The bus survey may include one or more fields for inputting one or more buses of the platform. In some instances, the bus survey can identify different bus properties for the respective bus that can be assigned by the user based on the user input at the input device 118.

In some examples, the platform description generator 108 can output each of the part property table 110, the connection property table 112, and the bus property table 114 on the output device 116. The user can employ the input device 118 to adjust or modify assigned properties to corresponding parts, connections, and the bus of the platform. In other examples, the platform description generator 108 can output the part, connection, and bus property tables 110, 112, and 114 on the output device 116, and the user can populate such as by assigning (e.g., by placing an "X") corresponding properties to respective parts, connections, and busses in respective part, connection, and bus property tables 110, 112, and 114. In these examples, the platform description generator 108 can survey the user for the parts, connections, and buses and provide the part, connection, and bus property tables 110, 112, and 114 for property assignment (e.g., via the input device 118).

Each property in each of the part property table 110, the connection property table 112, the bus property table 114 can be associated with a binary value (e.g., zero (0) or one (1)), a weight value (e.g., ranging from a negative value, such as 1 to a positive value, such as +1). A respective property assigned or selected for a respective part, connection, or bus can be associated or assigned a binary value of one (1) in a respective table 110, 112, and 114. In some instances, a cost value can be assigned to each property in each of the respective tables 110, 112, and 114. A weight value can have a positive magnitude to indicate that the respective property has a positive characteristic, and a negative magnitude to indicate that the respective property has a negative characteristic. Thus, properties for the parts, connections, and buses can have positive or negative characteristics.

The weights for each property can be determined in a number of ways. In one example, the weights can be determined by the user. For example, one or more cyber experts can input a subjective weight based on their experience. In another example, these weights can be determined by fitting survivability data 142 to real-world data. For example, if the survivability data 142 is a predicted list of vulnerable parts, this can be compared to a human-compiled list of vulnerable parts. The weights can be fine-tuned until the predicted list matches the human-compiled list.

The processing unit 106 can access the memory 104 to execute a component analyzer 120. The component analyzer 120 can process the part property table 110 to compute a part score for each identified part in the part property table 110. The part score can be indicative of a cyber resiliency of the part of the platform to withstand a potential cyber-attack. Thus, the part score can be indicative of component cyber resiliency. For example, the component analyzer 120 can process associated binary and weight values for each identified part to compute a respective part score. The component analyzer 120 can process the connection property table 112 to compute a connection score for each identified connection in the connection property table 112. The connection score can be indicative of a likelihood that a respective connection in the platform is to be used during the potential cyber-attack. Thus, the connection score can be indicative of an interface cyber resiliency of a respective interface to be used during a cyber-attack. For example, the component analyzer 120 can process associated binary and weight values for each identified connection to compute a respective connection score. The component analyzer 120 can process the bus property table 114 to compute a bus score for each identified bus in the bus property table 114. The bus score can be indicative of a likelihood that a bus of the platform is to be used during the potential cyber-attack. For example, the component analyzer 120 can process associated binary and weight values for each identified bus to compute a respective bus score.

The component analyzer 120 can generate score data 122 for processing by an architecture modeling engine 124. The score data 122 can include each computed score for each part, connection, and bus. The component analyzer 120 can generate a partitioned part property table 126. The component analyzer 120 can process the part property table 110 to identify source and target properties for respective parts to provide the partitioned part property table 126 to the architecture modeling engine 124. Thus, the component analyzer 120 can partition the part property table 110 to provide the partitioned part property table 126. The source properties of the partitioned part property table 126 can be used by the architecture modeling engine 124 to determine which parts are considered as entry points into the platform. The target properties of the partitioned part property table 126 can be used by the architecture modeling engine 124 to determine which parts lead to an end state corresponding to a successful attack on the respective part.

For example, the architecture modeling engine 124 can receive architecture description data 128 characterizing a target architecture for the platform. For example, the architecture description data 128 can provide a topological description of how parts (e.g., sub-systems) are to be connected in the platform based on the target architecture. The architecture modeling engine 124 can be programmed to generate an architecture model 132 based on the architecture description data 128. The architecture modeling engine 124 can further receive attack goal description data 130 that can identify sources and target properties. One or more source properties identified by the attack goal description data 130 can be used by the architecture modeling engine 124 to flag (e.g., associate) parts of the platform as sources for a potential cyber-attack. The architecture modeling engine 124 can compare the one or more source properties of the attack goal description data 130 to the partitioned part property table 126 to identify corresponding parts that are to be identified (e.g., labeled, flagged, etc.) as sources (e.g., entry points) of the potential cyber-attack in an architecture model 132. One or more target properties identified by the attack goal description data 130 can be used by the architecture modeling engine 124 to flag (e.g., associate) parts of the platform as a target of the potential cyber-attack. The architecture modeling engine 124 can compare the one or more target properties of the attack goal description data 130 to the partitioned part property table 126 to identify corresponding parts that are to be identified (e.g., labeled, flagged, etc.) as targets for the potential cyber-attack in the architecture model 132 of the target architecture for the platform.

By way of further example, the architecture modeling engine 124 can add start and end conditions to the architecture model 132. A start condition can be indicative of a cyber-attack start condition. For instance, in the given example, the start condition can be a removable media condition (e.g., indicating that a cyber-attack starts via a portable device, such as a USB, CD, etc.). In some examples, the start condition can be an RF-enabled condition (e.g., indicating that the cyber-attack starts over a wireless connection), or a direct connection (e.g., indicating that the cyber-attack starts over a wired connection). An end condition can be indicative of a cyber-attack end condition. For instance, in the given example, the end condition can be a safety-critical or flight-critical condition (e.g., indicating which respective parts can result in a successful attack). By way of example, if the unauthorized user's goal is to endanger lives, the exit condition can be a safety-critical condition. Any part with a safety-critical part property can be a target (e.g., can transition to an exit state corresponding to a successful attack). In another example, the end condition can be when the attack is stopped. One or more parts of the platform can transition to the exit state corresponding to the unsuccessful attack.

The architecture modeling engine 124 can compute a probability model 134 based on the scores data 122. The probability model 134 can include a part probability value for each part representative of a likelihood of the respective part preventing or stopping the potential cyber-attack (e.g., from spreading downstream to other parts, or compromising said part in the platform). A part probability value close to zero can indicate that the respective part has a low likelihood of preventing or stopping the potential cyber-attack. A part probability value close to one can indicate that the respective part has a high likelihood of preventing or stopping the potential cyber-attack. Furthermore, the probability model 134 can include a connection probability value for each connection representative of a likelihood of the potential cyber-attack using a respective connection. A connection probability value close to zero can indicate that there is a low likelihood that the respective connection will be used during the potential cyber-attack. A connection probability value close to one can indicate that there is a high likelihood that the respective connection will be used during the potential cyber-attack. Moreover, the probability model 134 can include a bus probability value for each bus representative of a likelihood of the potential cyber-attack using a respective bus. A bus probability value close to zero can indicate that there is a low likelihood that the respective bus will be used during the potential cyber-attack. A bus probability value close to one can indicate that there is a high likelihood that the respective bus will be used during the potential cyber-attack.

In further examples, the processing unit 106 can access the memory 104 to execute a survivability analysis engine 136. The survivability analysis engine 136 can include a first analysis tool 138. In an example, the first analysis tool 138 can be implemented to use a Markov model as a matrix equation to compute part contribution probability values for parts. The first analysis tool 138 can use the architecture model 132 and the probability model 134 to determine a likelihood (e.g., as a percentage) that the potential cyber-attack is successful or unsuccessful in compromising one or more target parts. The first analysis tool 138 can compute a part contribution probability value indicative of the contribution of the respective part to a successful cyber-attack of a target part. Thus, the part contribution probability value can indicate that a given percentage of cyber-attacks that arrive at the respective cyber-attack result in a successful cyber-attack of the target part. In the given example, the first analysis tool 138 can determine that 85% of potential cyber-attacks arriving at the WiFi interface (e.g., the embedded modem) result in a successful cyberattack of one or more of the brake system, the steering system, and the engine control system.

In some instances, the first analysis tool 138 can identify respective entry points for the potential cyber-attack that are most likely to lead to a successful or unsuccessful compromise of the one or more target parts. For example, the first analysis tool 138 can evaluate part contribution probability values for respective parts that are entry points relative to a part contribution threshold to identify one or more parts of the respective parts of the platform that are equal to or greater than the part contribution threshold. The part contribution threshold can be representative of entry points that are most likely to lead to a successful compromise of the one or more target parts. In some instances, the first analysis tool 138 can compute a survivability score (e.g., a survivability metric) for the platform indicative of whether the platform would be able to survive the potential cyber-attack based on a worst-case scenario. For example, the first analysis tool 138 can evaluate the part contribution probability values for respective parts that are entry points and identify a given part contribution probability value that has a greatest value. The first analysis tool 138 can compute the survivability score by subtracting the given part contribution probability value from a reference value (e.g., one (1)) to get the survivability score for the platform.

In the given example, the first analysis tool 138 can determine that 85% of potential cyber-attacks arriving at the WiFi interface (e.g., the embedded modem), 65% of the potential cyber-attacks arriving at the Bluetooth interface, and 70% of the potential cyber-attacks arriving at the data interface result in a successful cyber-attack of one or more of the brake system, the steering system, and the engine control system. The first analysis tool 138 can select the WiFi interface as this interface has a greatest part contribution probability value and compute that the platform has a 15% survivability score (e.g., 100%−85%=15%). Because the WiFi interface has a 15% survivability score and thus is a weakest point of the platform this can control an overall survival rate of the platform for the target architecture.

In some examples, the survivability analysis engine 136 includes a second analysis tool 140. In an example, the second analysis tool 140 is implemented as a Monte Carlo analysis tool. The second analysis tool 140 can simulate potential cyber-attacks by stepping through the architecture model 132 to identify possible next moves in the cyber-attack vector. The next move is chosen randomly according to a probability distribution derived from the probability model 134. The term "cyber-attack vector" and its derivatives as used herein can refer to one or more attack paths or pathways that an unauthorized user and/or malicious code can exploit to gain entry to a part of the platform and/or attack said part of the platform. A cyber-attack vector can identify an entry point of the platform that may be exploited by the unauthorized user and/or malicious code to the platform. While examples are described herein wherein the first analysis tool 138 is implemented as a Markov model and the second analysis tool 140 is implemented as a Monte Carlo analysis tool in different examples different tools can be used to implement respective tool functions as described herein.

In some instances, the second analysis tool 140 can compute a frequency of a respective cyber-attack vector over multiple simulation iterations to identify the most vulnerable parts of the platform. The survivability data 142 in some instances can include the survivability score for each identified cyber-attack vector indicative of whether the platform based on the target architecture survives a corresponding cyber-attack vector. In some instances, the survivability data 142 may include the architecture model 132 for rendering on the output device 116. For example, in further examples, the processing unit 106 can access the memory 104 to execute a graphical user interface (GUI) generator 144. The GUI generator 144 can render the architecture model 132 on the output device 116 and annotate the architecture model 132 to show how far into the platform the cyber-attack progressed, and identify the most vulnerable components.

In some instances, the survivability data 142 can be used to revise the target architecture for the platform to eliminate one or more identified cyber-attack vectors, and/or reduce a likelihood that the one or more identified cyber-attack vectors harm the platform (e.g., undermine a mission objective). Thus, the survivability data 142 can be used as cyber vulnerability analysis feedback data to improve an efficiency and overall cyber vulnerability of the platform by enabling one or more users (e.g., system engineers) to improve the target architecture on which the platform will be based.

Figure 2:
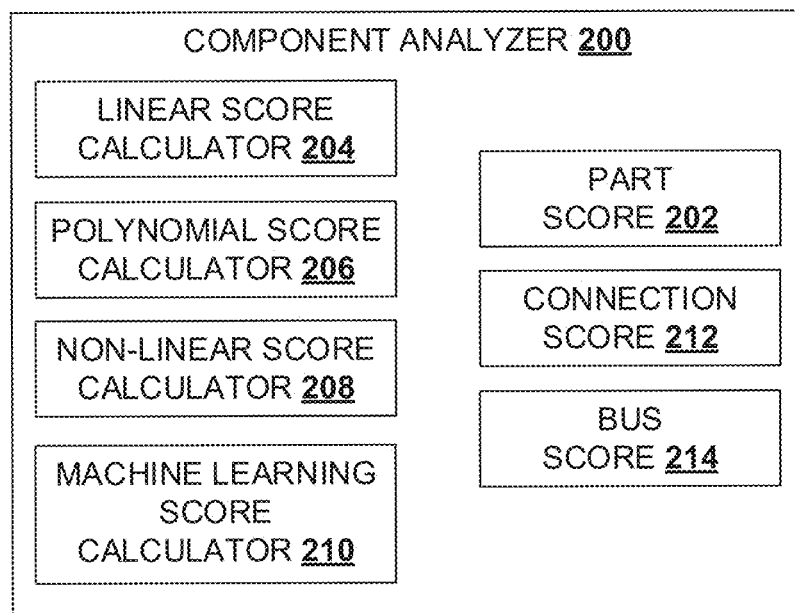
FIG. 2 is an example of a component analyzer.

FIG. 2 is an example of a component analyzer 200, such as the component analyzer 120, as shown in FIG. 1. Thus, in some examples, reference can be made to FIG. 1 in the example of FIG. 2. The component analyzer 200 can process the part property table 110 to compute a part score 202 for each identified part in the part property table 110. For example, the component analyzer 200 can include a linear score calculator 204. The linear score calculator 204 can implement a linear score calculation equation to compute the part score 202 based on binary and weight values for a respective part from the part property table 110. For instance, if a respective part has two (2) assigned part properties, and each assigned part property is assigned a binary and weight value, such as B1, W1, and B2, W2, the part score 202 can be computed as follows by the linear score calculator 204: $SP=B1 \times W1+B2 \times W2$, wherein SP is the part score 202.

In some instances, the component analyzer 200 includes a polynomial calculator 206. The polynomial score calculator 206 can implement a polynomial score calculation equation to compute the part score 202 based on binary and weight values for the respective part from the part property table 110. For instance, if the respective part has two (2) assigned part properties, and each assigned part property is assigned a binary and weight value, such as B1, W1, and B2, W2, the part score 202 can be computed as follows by the polynomial score calculator 206: SP=B1×W1+B2×W2+B1× W1×B2×W2, wherein SP is the part score 202. In some examples, the component analyzer 200 can include a non-linear calculator 208. The non-linear calculator 208 can implement a non-linear score calculation equation to compute the part score 202 based on binary and weight values for the respective part from the part property table 110. For instance, if the respective part has two (2) assigned part properties, and each assigned part property is assigned a binary and weight value, such as B1, W1, and B2, W2, the part score 202 can be computed as follows by the non-linear calculator 208: SP=B1×W1+e^(B2×W2), wherein SP is the part score 202.

In some examples, the component analyzer 200 can include a machine learning score calculator 210. The machine learning score calculator 210 can employ a machine learning algorithm that can be trained to compute the part score 202 based on binary and weight values for the respective part from the part property table 110. By way of further example, each of the linear, polynomial, non-linear, and machine learning score calculators 204, 206, 208, and 210 can compute a respective part score, and the component analyzer 200 can compute an average part score as the part score 202 based on the computed respective part scores by each calculator 204, 206, 208, and 210. The component analyzer 200 can compute a connection score 212 for a respective connection, and a bus score for a respective bus in a same or similar manner as described herein with respect to the part score 202. The component analyzer 200 can provide the part score 202, the connection score 212, and the bus score 214 as or as part of the score data 122 to the architecture modeling engine 124. While certain calculators are described herein with respect to FIG. 2 for computing a corresponding score, in other examples, different and/or similar calculators can be used for score computing.

Figure 3:
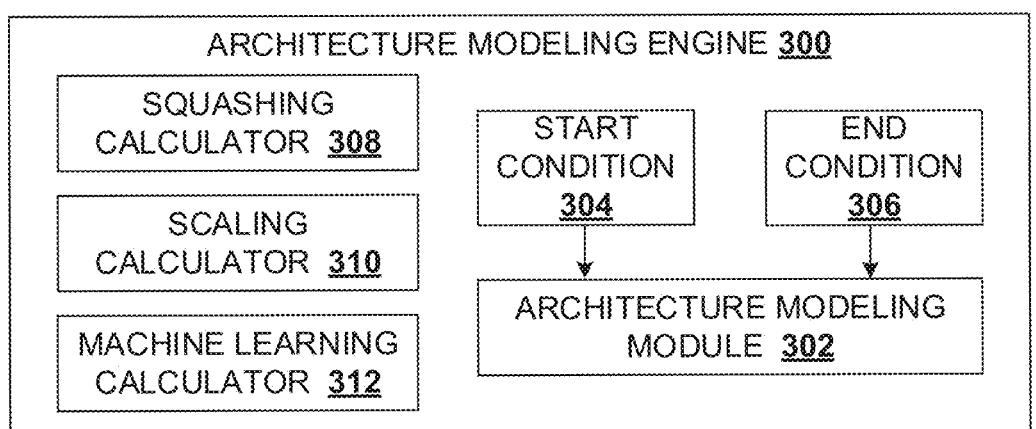
FIG. 3 is an example of an architecture modeling engine.

FIG. 3 is an example of an architecture modeling engine 300, such as the architecture modeling engine 124, as shown in FIG. 1. Thus, in some examples, reference can be made to FIG. 1 in the example of FIG. 3. The architecture modeling engine 300 can include an architecture modeling module 302. The architecture modeling module 302 can process the architecture description data 128 to compute the architecture model 132. The architecture modeling module 302 can receive start and end condition data 304 and 306 indicative of respectively where a cyber-attack can begin and end. In some examples, the architecture modeling engine 300 includes a squashing calculator 308. The squashing calculator 308 can implement a sigmoidal function to compute the part probability value for the respective part based on a part score from the scores data 122. By way of example, the sigmoidal function can be represented as f(x)=0.5±0.5*tanh(x), wherein x is the part score value for the respective part.

In some instances, the architecture modeling engine 300 includes a scaling calculator 310. The scaling calculator 310 can implement a scaling function to compute the part probability value for the respective part based on the part score from the scores data 122. By way of example, the scaling function can be represented as (value-min)/(max-min), wherein a min and a max represent the minimum and maximum scores across the entire system. By way of further example, the architecture modeling engine 300 includes a machine learning calculator 312. The machine learning calculator 312 can employ a machine learning algorithm that can be trained to compute the part probability value based on the part score from the scores data 122. The architecture modeling engine 300 can compute a connection probability value for a respective connection, and a bus probability value for a respective bus in a same or similar manner as described herein with respect to the part probability value. The architecture modeling engine 300 can output the computed part, connection, and bus probability values as the probability model 134, which can be provided to the survivability analysis engine 136. While certain calculators are described herein with respect to FIG. 3 for computing a corresponding probability value, in other examples, different and/or similar calculators can be used for probability computations.

FIG. 4 is an example of a party property table 400, such as the part property table 110, as shown in FIG. 1. Thus, in some examples, reference can be made to FIGS. 1-2 in the example of FIG. 4. The part property table 400 can include a first general property (labeled as "PART PROPERTY 1"), a second general property (labeled as "PART PROPERTY 2"), a first source property (labeled as "SOURCE PROPERTY 1"), a second source property (labeled as "SOURCE PROPERTY 2"), a first target property (labeled as "TARGET PROPERTY 1"), and a second target property (labeled as "TARGET PROPERTY 2"). While the example of FIG. 4 illustrates two (2) of each of general, source, and target properties defined for parts of a platform, in other examples, any given number of general, source, and target properties can be defined for parts of the platform.

In the example of FIG. 4, the parts of the platform are identified as A, B, and C. As described herein, the platform description generator 108 can provide the part property table 400 with properties associated with a respective one of the parts A, B, and C. In the example of FIG. 4, the association is shown with a cell of the part property table 400 containing an "X." For determining a part score for each part, the platform description generator 108 can assign each cell of the part property table 400 that does not contain an "X" a zero (0) binary value, and each cell that contains an "X" a one (1) binary value. As described herein, each of the general, source, and target properties can be associated with a weight value. The component analyzer 120 or 200 can identify respective binary values for each of the parts A, B, and C for computing a respective part score (e.g., the part score 202, as shown in FIG. 2) for each part by evaluating a column of a respective part of the part property table 400. For example, the component analyzer 120 or 200 can determine that the part A has the following binary values 1,0,1,0,0,0, that the part B has the following binary values 0,1,0,0,0,1, and that the part C has the following binary values 1,1,0,1,1,0.

FIG. 5 is an example of a connection property table 500, such as the connection property table 112, as shown in FIG. 1. Thus, in some examples, reference can be made to FIGS. 1-2 in the example of FIG. 5. The connection property table 500 can include a first connection property (labeled as "CONNECTION PROPERTY 1"), a second connection property (labeled as "CONNECTION PROPERTY 2"), and a third connection property (labeled as "CONNECTION PROPERTY 3"). While the example of FIG. 5 illustrates three (3) connection properties defined for connections between parts of a platform, in other examples, any given number of connection properties can be defined for the connections of the platform. In the example of FIG. 5, the connections include a first connection (labeled as "A::B") between a first part (labeled as "A") and a second part (labeled as "B") and a second connection (labeled as "A:: C") between the first part and a third part (labeled as "C'). As described herein, the platform description generator 108 can provide the connection property table 500 with connection properties associated with a respective one of the first and second connections. In the example of FIG. 5, the association is shown with a cell of the connection property table 500 containing an "X."

For determining a connection score for the first and second connections, the platform description generator 108 can assign each cell of the connection property table 500 that does not contain an "X" a zero (0) binary value, and each cell that contains an "X" a one (1) binary value. Each of the first, second, and third connection properties can be associated with a weight value. The component analyzer 120 or 200 can identify respective binary values for each of the first and second connections for computing a respective connection score (e.g., the connection score 212, as shown in FIG. 2) for each connection by evaluating a column of a respective connection of the connection property table 500. For example, the component analyzer 120 or 200 can be programmed to determine that the first connection has the following binary values 1, 1, 1, and that the second connection has the following binary values 1, 1, 0.

FIG. 6 is an example of a bus property table 600, such as the bus property table 114, as shown in FIG. 1. Thus, in some examples, reference can be made to FIGS. 1-2 in the example of FIG. 6. The bus property table 600 can include a first bus property (labeled as "BUS PROPERTY 1"), a second bus property (labeled as "BUS PROPERTY 2"), and a third bus property (labeled as "BUS PROPERTY 3"). While the example of FIG. 6 illustrates three (3) bus properties defined for a first bus (labeled as "BUS1") of a platform, in other examples, any given number of bus properties can be defined for one or more buses of the platform. As described herein, the platform description generator 108 can provide the bus property table 600 with bus properties associated with the first bus. In the example of FIG. 6, the association is shown with a cell of the bus property table 600 containing an "X."

For determining a bus score for the first bus, the platform description generator 108 can assign each cell of the bus property table 600 that does not contain an "X" a zero (0) binary value, and each cell that contains an "X" a one (1) binary value. Each of the first, second, and third bus properties can be associated with a weight value. The component analyzer 120 or 200 can identify respective binary values for the first bus for computing a respective bus score (e.g., the bus score 214, as shown in FIG. 2) for each connection by evaluating a column of a respective connection of the connection property table 500. For example, the component analyzer 120 or 200 can determine that the first bus has the following binary values 0, 1, 1.

Figures 7, 8:
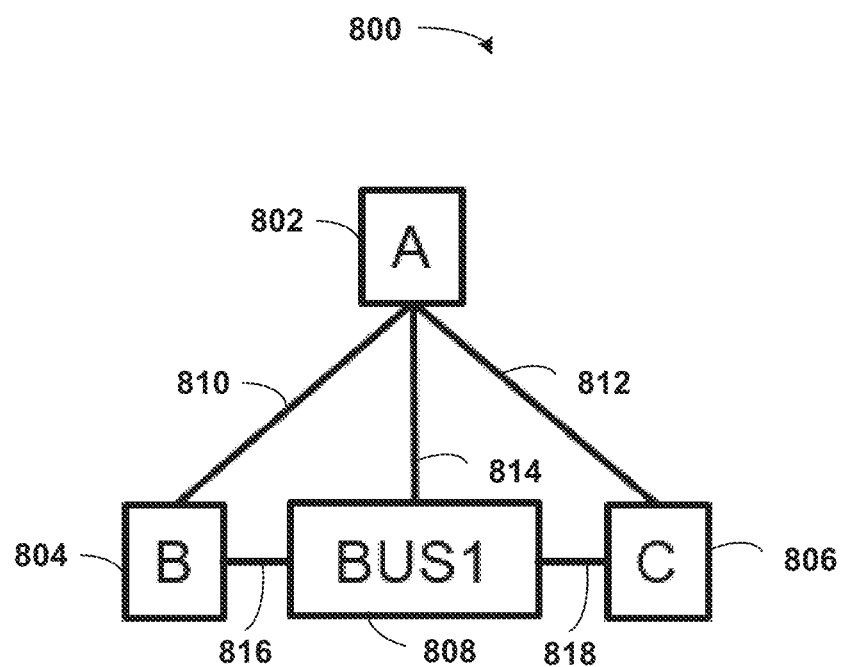
FIG. 7 is an example of a score table.
FIG. 8 is an example of an architecture model.

FIG. 7 is an example of a score table 700. The score table 700 can be or can be included as part of the score data 122, as shown in FIG. 1. Thus, in some examples, reference can be made to FIGS. 1-2 and 4-6 in the example of FIG. 7. The component analyzer 120 can provide the score table 700. For example, the component analyzer 120 or 200 can compute a part score for each of the parts A, B, C, a connection score for each of the first and second connections, and a bus score for the first bus in a same or similar manner as described herein.

FIG. 8 is an example of an architecture model 800, such as the architecture model 132, as shown in FIG. 1. Thus, in some examples, reference can be made to FIGS. 1-7 in the example of FIG. 8. The architecture model 800 can be generated by the architecture modeling engine 124 or 300 based on the architecture description data 128 for a target architecture of a platform. In the given example, the platform is the aircraft system, and thus the target architecture can be a physical architecture of the aircraft system. The architecture model 800 can be representative of the target architecture of the platform. In the example of FIG. 8, the architecture model 800 includes a first part 802 (labeled as "A"), a second part 804 (labeled as "B"), and a third part 806 (labeled as "C"), and a first bus 808 (labeled as "BUS1"). A first connection 808 can connect the first and second parts 802 and 804, a second connection 812 can connect the first and third parts 802 and 806, and a third connection 814 can connect the first part 802 and the first bus 808. A fourth connection 816 can connect the second part 804 and the first bus 808, and a fifth connection 818 can connect the third part 806 and the first bus 808. As an example, the architecture model 800 can be representative of a self-driving car, wherein the first part 802 can be a satellite communication link for updates, the second part B 804 can be a steering wheel, the third part 806 can be a smart-phone compatible USB port, and the first bus 808 can be a vehicle bus network. In other examples, the architecture model 800 can be representative of a different platform.

By way of example, the source properties of the partitioned part property table 126 can be used by the architecture modeling engine 124 to determine which parts of the architecture model 800 are considered as entry points into the platform. The target properties of the partitioned part property table 126 can be used by the architecture modeling engine 124 to determine which parts of the architecture model 800 lead to an end state corresponding to a successful attack on the respective part. The architecture modeling engine 124 can use one or more source properties identified by the attack goal description data 130 to flag (e.g., associate) parts of the architecture model 800 as an entry point for a potential cyber-attack, and use one or more target properties identified by the attack goal description data 130 to flag (e.g., associate) parts of the architecture model 800 as a target of the potential cyber-attack.

FIG. 9 is an example of a partial probability table 700. The partial probability table 700 can be representative of some of the probability model 134, as shown in FIG. 1. Thus, in some examples, reference can be made to FIGS. 1-8 in the example of FIG. 9. The architecture modeling engine 124 or 300 can provide the probability table 700 in a same or similar manner as described herein. For example, the architecture modeling engine 124 or 300 can compute a respective part, connection, and bus property value for each of the parts 802, 804, 806, the connections 810, 812, and 814, and the first bus 808, as shown in FIG. 8. By way of example, the part 804 is shown in the probability table 700 with a part property value of 75%, which indicates that the part 804 of FIG. 8 has a 75% chance of preventing or stopping a potential cyber-attack. These transition probabilities are part of the probability model 134 which can be based on the scores 122 of the connections and busses.

In FIG. 9, the bottom row, labeled "START", shows the probability of starting the attack through a particular part. For example, only part A is an entry point so this attack has a 100% chance of starting there. In another example, if there were multiple entry points, these probabilities could be equally divided across all entry points. In FIG. 9, the two right-most columns, labeled "END 1" and "END 2", shows the probabilities of ending the attack at a particular part. END 1 corresponds to a successful attack and END 2 corresponds to an unsuccessful attack. In one example, each time an attack reaches part A, there is a 12% chance the attack will be stopped and thus result in an unsuccessful attack. If the attack is not stopped at part A, then the attacker can continue to move to part B, part C, or BUS1. In some examples, each time an attack reaches part B, it has a 67% percent chance of stopping the attack otherwise it will be a successful attack, moving to END 2. These probabilities are part of the probability model 134 which can be based on the scores 122 of the parts and busses.

FIG. 10 is an example of a survivability table 1000. The survivability table 1000 can be generated by the survivability analysis engine 136, as shown in FIG. 1. Thus, in some examples, reference can be made to FIGS. 1 and 8 in the example of FIG. 10. The survivability table 1000 can be provided as part of the survivability data 142, and thus can be rendered on the output device 116. The survivability table 1000 includes a survivability score for each part of a platform. For example, the survivability table 1000 includes a respective survivability score for each of the parts 802, 804, and 806 and the first bus 808. In some instances, the survivability analysis engine 136 can employ the first and second tools 138 and 140 to compute the survivability scores for each of the parts 802, 804, and 806 and the first bus 808. In the example of FIG. 10, a first column (labeled as "TOOL 1") can include survivability scores computed by the first tool 138, and a second column (labeled as "TOOL 2") can include survivability scores computed by the second tool 140. Each survivability score in the survivability table 1000 can be indicative of whether a respective part or bus survives a potential cyber-attack. By way of example, the part 802 has a low survivability score and thus can indicate that the part requires updating of cyber security vulnerabilities and thus allow for improving an overall cyber security performance of the platform. For example, a user can modify the target architecture for the platform and the systems and methods can process the modified target architecture to compute a new survivability table to confirm whether the survivability score for the part 802 has increased.

The survivability analysis engine 136 can have one or more tools, in some examples, such as described herein. Each tool can be programmed in more than one way to output survivability scores. In one instance, the first tool 138 represents the architecture model 132 and probability model 134 as a system of equations which represent how each part, connection, and bus influence each other. In the example of table 1000, each equation in the system would be in the form: 0.0*VA+0.75*VB+0.01*VC+0.12*VBUS1+ 0.0*VEND1+0.12*VEND2=0. Where the goal is to solve for the values: VA, VB, VC, and VBUS1. The solution can be scaled by choice of VEND1 and VEND2. To scale these values in terms of a successful attack, the values can be VEND1=1.0 and VEND2=0.0. The values VA, VB, VC, and VBUS1 can represent a contribution of each part and bus to the attack. Thus, one minus these values can represent their contribution to the overall survivability of the system. These survivability estimates are shown in table 1000 in the column under TOOL 1. The part and bus scores can be extended to connections by some combination of the scores and probabilities of the parts or busses it is connected to. The survivability estimates for the parts, connections, and busses can provide or create a picture of which parts are most likely to lead to a successful attack. For example, the survivability table 1000 under TOOL 1 shows part A has the lowest score which may indicate that part A is a desirable pivot point for the attacker.

In another example, the second tool 134 simulates attacks one at a time. After a given number of runs, the values in survivability table 1000 under TOOL 2 by the percent of these runs which the attack did not reach the part, connection, or bus. For example, of 100 runs the attack never reach part C 79 times. The other 21 times the attack did use part A. This provides a different survivability estimate for the parts, connections, and busses, which create a penetration picture of how far into the system an attacker can infiltrate. For example, table 1100 under TOOL 2 shows that the connection between BUS 1 and Part B has the lowest score, this may indicate that it the connection needs more preventative measures.

FIG. 11 is an example of another survivability table 1100. The survivability table 1100 can be generated by the survivability analysis engine 136, as shown in FIG. 1. Thus, in some examples, reference can be made to FIGS. 1, 8, and 10 in the example of FIG. 11. For example, reference can be made to FIG. 10 with respect to FIG. 11 as to how the survivability scores as shown therein can be computed. The survivability table 1100 can be provided as part of the survivability data 142, and thus can be rendered on the output device 116. The survivability table 1100 includes a survivability score for each connection of a platform. For example, the survivability table 1100 includes a respective survivability score for each of the connections 810, 812, 814, 816, and 818. In some instances, the survivability analysis engine 136 can employ the first and second tools 138 and 140 to compute the survivability scores for each of the connections 810, 812, 814, 816, and 818.

In the example of FIG. 11, a first column (labeled as "TOOL 1") can include survivability scores computed by the first tool 138, and a second column (labeled as "TOOL 2") can include survivability scores computed by the second tool 140. Each survivability score in the survivability table 1100 can be indicative of whether a respective connection survives a potential cyber-attack. By way of example, the connection 814 has a low survivability score and thus can indicate that the connection requires updating (e.g., by using encryption) of cyber security vulnerabilities and thus allow for improving an overall cyber security performance of the platform. As an example, the connection 814 can be a physical wire and a protocol for traversing the connection 814. For example, a user can modify the target architecture for the platform and the systems and methods can process the modified target architecture to compute a new survivability table 1100 to confirm whether the survivability score for the connection 814 has increased corresponding to an improvement in cyber security of the connection 814. By way of example, the connection 814 can be modified to include encryption thereby making it more difficult to be attacked.

Figure 12:
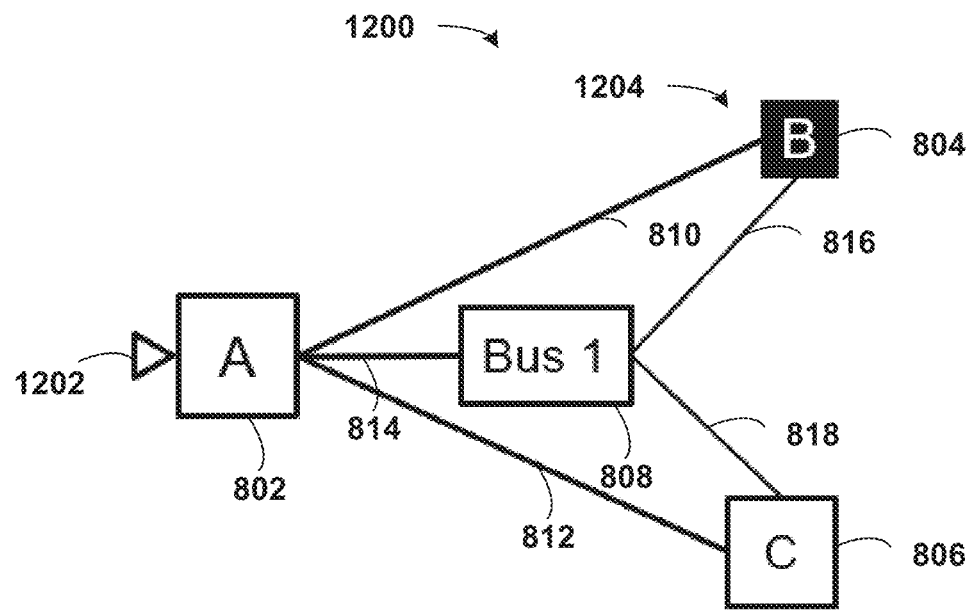
FIG. 12 is an example of a graphical representation of an architecture model post evaluation.

FIG. 12 is an example of a graphical representation of an architecture model 1200 post evaluation by the survivability analysis engine 136, as shown in FIG. 1. Thus, in some examples, reference can be made to FIGS. 1-11 in the example of FIG. 12. The graphical representation of the architecture model 1200 can be rendered by the GUI generator 144 based on the survivability data 142 and the architecture model 132. The architecture model 1200 can be the architecture model 800, as shown in FIG. 8, and thus similar references numerals are used in FIG. 12. The graphical representation of the architecture model 1200 can be visualized on the output device 116. The graphical representation of the architecture model 1200 can include an entry point 1202 for a potential cyber-attack and indicate at 1204 (e.g., with a shading of the part 804) that the cyber-attack successfully attacked or compromised the part 804. In the example of FIG. 12, the part 804 is a target of the cyber-attack.

Figure 13:
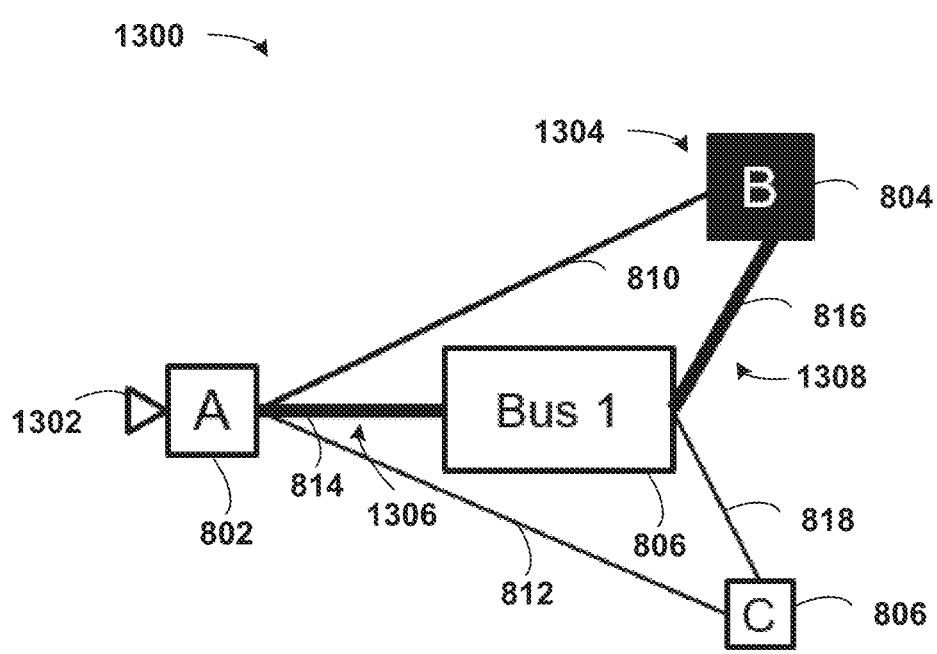
FIG. 13 is another example of a graphical representation of an architecture model post evaluation.

FIG. 13 is an example of a graphical representation of an architecture model 1300 post evaluation by the survivability analysis engine 136, as shown in FIG. 1. Thus, in some examples, reference can be made to FIGS. 1-11 in the example of FIG. 13. The graphical representation of the architecture model 1300 can be rendered by the GUI generator 144 based on the survivability data 142 and the architecture model 132. The architecture model 1300 can be the architecture model 800, as shown in FIG. 8, and thus similar references numerals are used in FIG. 13. The graphical representation of the architecture model 1200 can be visualized on the output device 116. The graphical representation of the architecture model 1300 can include an entry point 1302 for a potential cyber-attack and indicate at 1304 (e.g., with a shading of the part 804) that the cyber-attack successfully attacked or compromised the part 804. In the example of FIG. 13, the part 804 is a target of the cyber-attack. By way of further example, the graphical representation of an architecture model 1300 can include indications at 1306 and 1308 a pathway of the potential cyber-attack and thus identify most vulnerable parts and connections of the potential cyber-attack.

Figure 14:
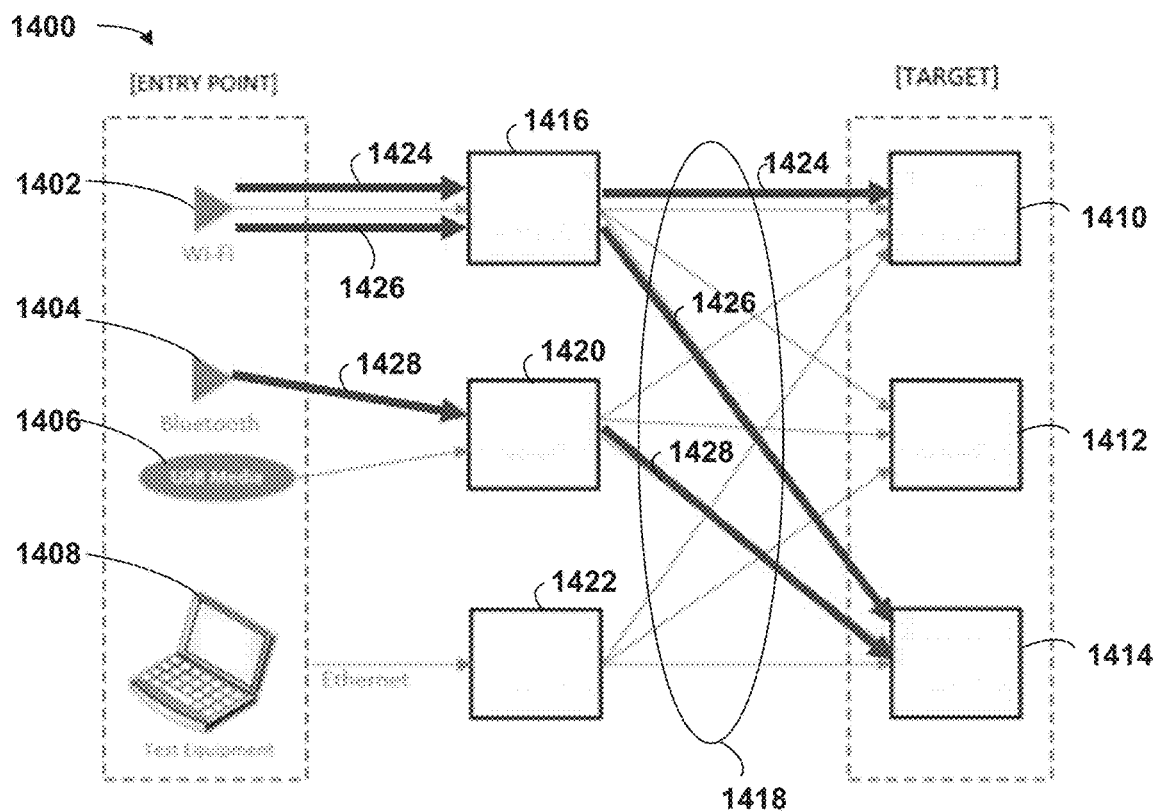
FIG. 14 is a further example of a graphical representation of an architecture model post evaluation.

FIG. 14 is an example of another graphical representation of an architecture model 1400 post evaluation by the survivability analysis engine 136, as shown in FIG. 1. Thus, in some examples, reference can be made to FIGS. 1-11 in the example of FIG. 14. The architecture model 1400 can be representative of a target architecture for the aircraft system, such as described herein with respect to the given example. Thus, in some examples, the graphical representation of the architecture model 1400 can be rendered by the GUI generator 144 based on the survivability data 142 and the architecture model 132. In the example of FIG. 14, the graphical representation of the architecture model 1400 can identify entry points into the aircraft system such as WiFi 1402, Bluetooth 1404, USB media 1406, and test equipment 1408. The entry points can be exploited by an unauthorized to gain access to targets of the aircraft system. In the example of FIG. 14, the targets are a brake system 1410, a steering control system 1412, and an engine control system 1414.

In the example of FIG. 14, the unauthorized user may exploit entry point 1402 to access an embedded modem 1416 and use the modem 1416 to gain access over a communications network 1418 to one of the targets 1410, 1412, and 1414. The communications network 1418 can include a CAN bus. In some instances, the unauthorized user may exploit entry point 1404 or 1406 to access a radio 1420 and use the radio 1420 to gain access over the communications network 1418 to one of the targets 1410, 1412, and 1414. In some instances, the unauthorized user may exploit entry point 1408 to access an OBD connector 1422 and use the OBD connector 1422 to gain access over the communications network 1418 to one of the targets 1410, 1412, and 1414. In the example of FIG. 14, cyber-attack vectors 1424, 1426, and 1428 for one or more potential cyber-attack vectors are identified. The one or more potential cyber-attack vectors 1424, 1426, and 1428 can be identified by the survivability analysis engine 136 in a same or similar manner as described herein. The user can employ graphical representation of an architecture model 1400 to identify cyber-attack vectors that the potential cyber-attack can take and use such vectors to update the target architecture for the platform to mitigate or remove the unauthorized user's ability to exploit such pathways in the platform based on the target architecture. For example, the user can update the target architecture for the aircraft system to eliminate at least one potential cyber-attack vector 1424, 1426, and 1428 by updating a security of the embedded modem 1416 and the radio 1420.

Figure 15:
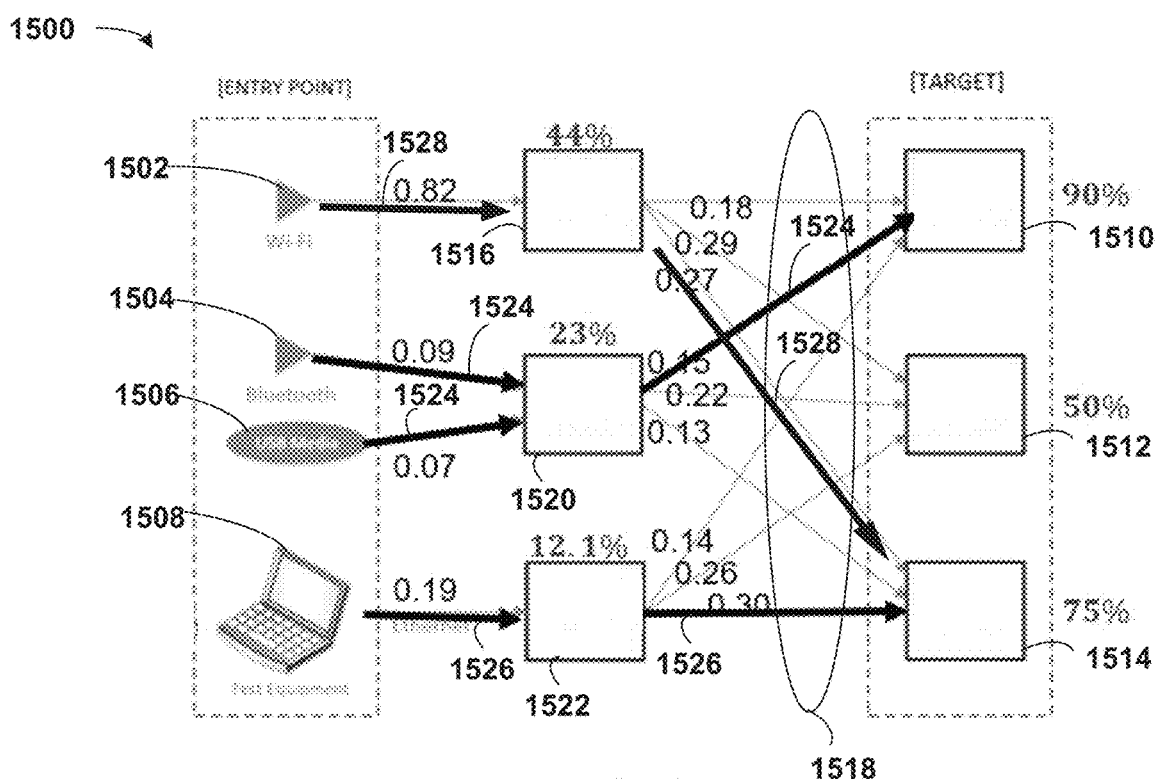
FIG. 15 is an example of a graphical representation of an architecture model post evaluation.

FIG. 15 is an example of another graphical representation of an architecture model 1500 post evaluation by the survivability analysis engine 136, as shown in FIG. 1. Thus, in some examples, reference can be made to FIGS. 1-11 in the example of FIG. 15. The architecture model 1500 can be representative of a target architecture for the aircraft system, such as described herein with respect to the given example. Thus, in some examples, the graphical representation of the architecture model 1500 can be rendered by the GUI generator 144 based on the survivability data 142 and the architecture model 132. In the example of FIG. 15, the graphical representation of the architecture model 1500 can identify entry points into the aircraft system such as WiFi 1502, Bluetooth 1504, USB media 1506, and test equipment 1508. The entry points can be exploited by an unauthorized to gain access to targets of the aircraft system. In the example of FIG. 15, the targets are a brake system 1510, a steering control system 1512, and an engine control system 1514.

In the example of FIG. 15, the unauthorized user may exploit entry point 1502 to access an embedded modem 1516 and use the modem 1516 to gain access over a communications network 1518 to one of the targets 1510, 1512, and 1514. The communications network can include a CAN bus. In some instances, the unauthorized user may exploit entry point 1504 or 1506 to access a radio 1520 and use the radio 1520 to gain access over the communications network 1518 to one of the targets 1510, 1512, and 1514. In some instances, the unauthorized user may exploit entry point 1508 to access an OBD connector 1522 and use the OBD connector 1522 to gain access over the communications network 1518 to one of the targets 1510, 1512, and 1514. The architecture model 1500 can be generated based on a Markov model, and identify transition probabilities (e.g., a probability that the unauthorized user will use such a connection or pathway), and attack success probabilities (e.g., indicative of whether such an attack is successful). In the example of FIG. 15, the architecture model 1500 can include or identify an attacker's best move 1524 and 1526 for attacking said targets, and a worst-case attack scenario 1528. The user can employ the graphical representation of the architecture model 1500 to update the target architecture for the platform to mitigate or remove the unauthorized user's ability to exploit particular pathways in the platform based on the target architecture. For example, the user can update the target architecture for the aircraft system to eliminate the worst-case attack scenario 1528 by updating a security of the embedded modem 1516.

Figure 16:
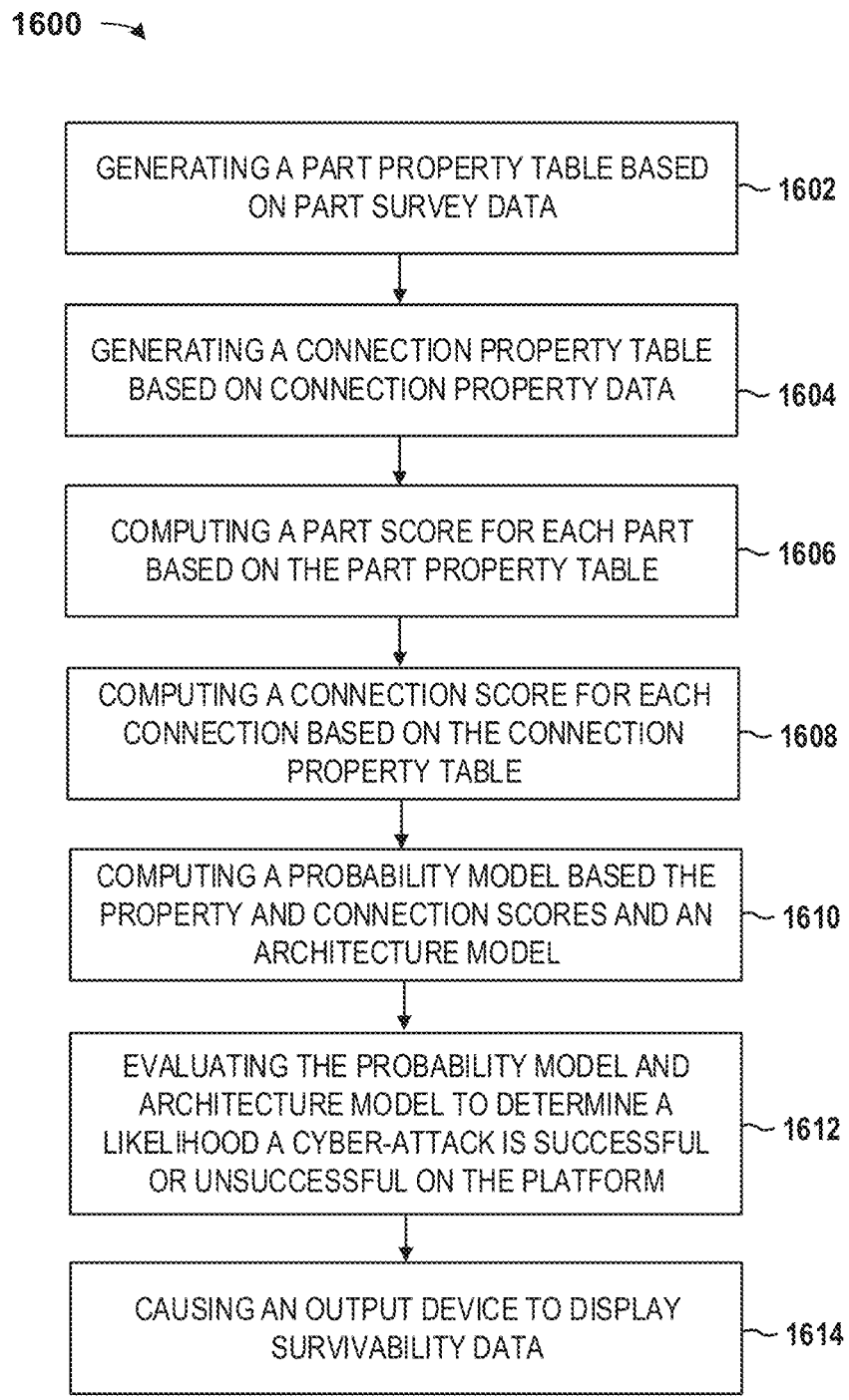
FIG. 16 is an example of a method for evaluating a platform for cyber threat vulnerabilities.
Figure 17:
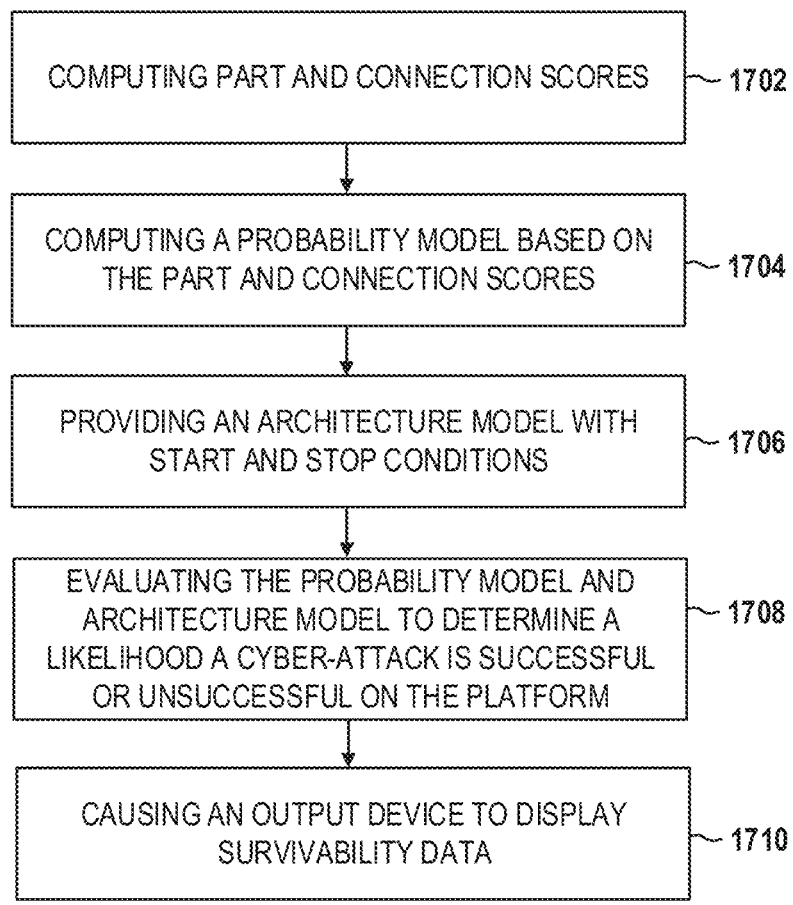
FIG. 17 is another example of a method for evaluating a platform for cyber threat vulnerabilities.

In view of the foregoing structural and functional features described above, an example method will be better appreciated with reference to FIGS. 16-17. While, for purposes of simplicity of explanation, the example methods of FIGS. 16-17 are shown and described as executing serially, it is to be understood and appreciated that the present examples are not limited by the illustrated order, as some actions could in other examples occur in different orders, multiple times and/or concurrently from that shown and described herein.

Moreover, it is not necessary that all described actions be performed to implement a method.

FIG. 16 is an example of a method 1600 for evaluating a platform for cyber threat vulnerabilities. The method 1600 can be implemented by the computing platform 102, as shown in FIG. 1. Thus, in some examples, reference can be made to FIG. 1 in the example of FIG. 16. The method 1600 can begin at 1602 by generating (e.g., using the platform description generator 108, as shown in FIG. 1) a part property table (e.g., the part property table 110, as shown in FIG. 1) identifying respective part properties for one or more parts of a platform based on part survey data (e.g., user input data received at the input device 118, as shown in FIG. 1). The property table can include respective binary and weights values associated with one of the one or more parts. At 1604, generating (e.g., using the platform description generator 108) a connection property table (e.g., the connection property table 112, as shown in FIG. 1) identifying respective connection properties for one or more connections of the platform based on connection survey data (e.g., user input data received at the input device 118). The connection property table can include respective binary and weights values associated with one of the one or more connections.

At 1606, computing (e.g., using the component analyzer 120, as shown in FIG. 1) a part score for each part of the platform based on the respective binary and weight values for a respective part of the one or more parts from the part property table. At 1608, computing a connection score for each connection of the platform based on the respective binary and weight values for a respective connection of the one or more connections from the connection property table. At 1610, computing (e.g., using the architecture modeling engine 124, as shown in FIG. 1) a probability model (e.g., the probability model 134, as shown in FIG. 1) based on the part and connection scores and an architecture model (e.g., the architecture model 132, as shown in FIG. 1). The probability model can include a part probability value and a connection probability value, and the architecture model can characterize a target architecture of the platform.

At 612, evaluating (e.g., using the survivability analysis engine 136, as shown in FIG. 1) the probability model and the architecture model to determine a likelihood that one or more potential cyber-attacks on the platform based on the target architecture are successful or unsuccessful in compromising at least one part of the platform. In some examples, the method 1600 can include at 1614, causing an output device to display survivability data characterizing the likelihood that the one or more potential cyber-attacks on the platform based on the target architecture are successful or unsuccessful. In some instances, the method 1600 can include generating a bus property table and providing a bus score in a same or similar manner as described herein. The bus score can be used by the architecture modeling engine for computing the probability model in a same or similar manner as described herein.

FIG. 17 is another example of a method 1700 for evaluating a platform for cyber threat vulnerabilities. The method 1700 can be implemented by the computing platform 102, as shown in FIG. 1. Thus, in some examples, reference can be made to FIG. 1 in the example of FIG. 17. The method 1700 can begin at 1702 by computing (e.g., using the component analyzer 120, as shown in FIG. 1) for each part and connection of a platform a respective part and connection score. At 1704, computing (e.g., using the architecture modeling engine 124, as shown in FIG. 1) a probability model (e.g., the probability model 134, as shown in FIG. 1) comprising a part probability value and a connection probability value for a corresponding part and connection of the platform based on the respective part and connection score.

At 1706, providing (e.g., using the architecture modeling engine 124, as shown in FIG. 1) an architecture model (e.g., the architecture model 132, as shown in FIG. 1) with start and end conditions indicative respectively of where at least one potential cyber-attack can begin and end with respect to the platform based on architecture description data (e.g., the architecture description data 128, as shown in FIG. 1) characterizing a target architecture of the platform, and start and end condition data. At 1708, evaluating (e.g., using the survivability analysis engine 136, as shown in FIG. 1) the probability model and the architecture model to determine a likelihood that one or more potential cyber-attacks are successful or unsuccessful in compromising the at least one part of the platform. In some examples, the method 1700 can include at 1710, causing an output device to display survivability data characterizing the likelihood that the one or more potential cyber-attacks on the platform based on the target architecture are successful or unsuccessful. In some instances, the method 1700 can include computing a bus score for each bus of the platform and the probability model is computed based on the bus score in a same or similar manner as described herein.

Figure 18:
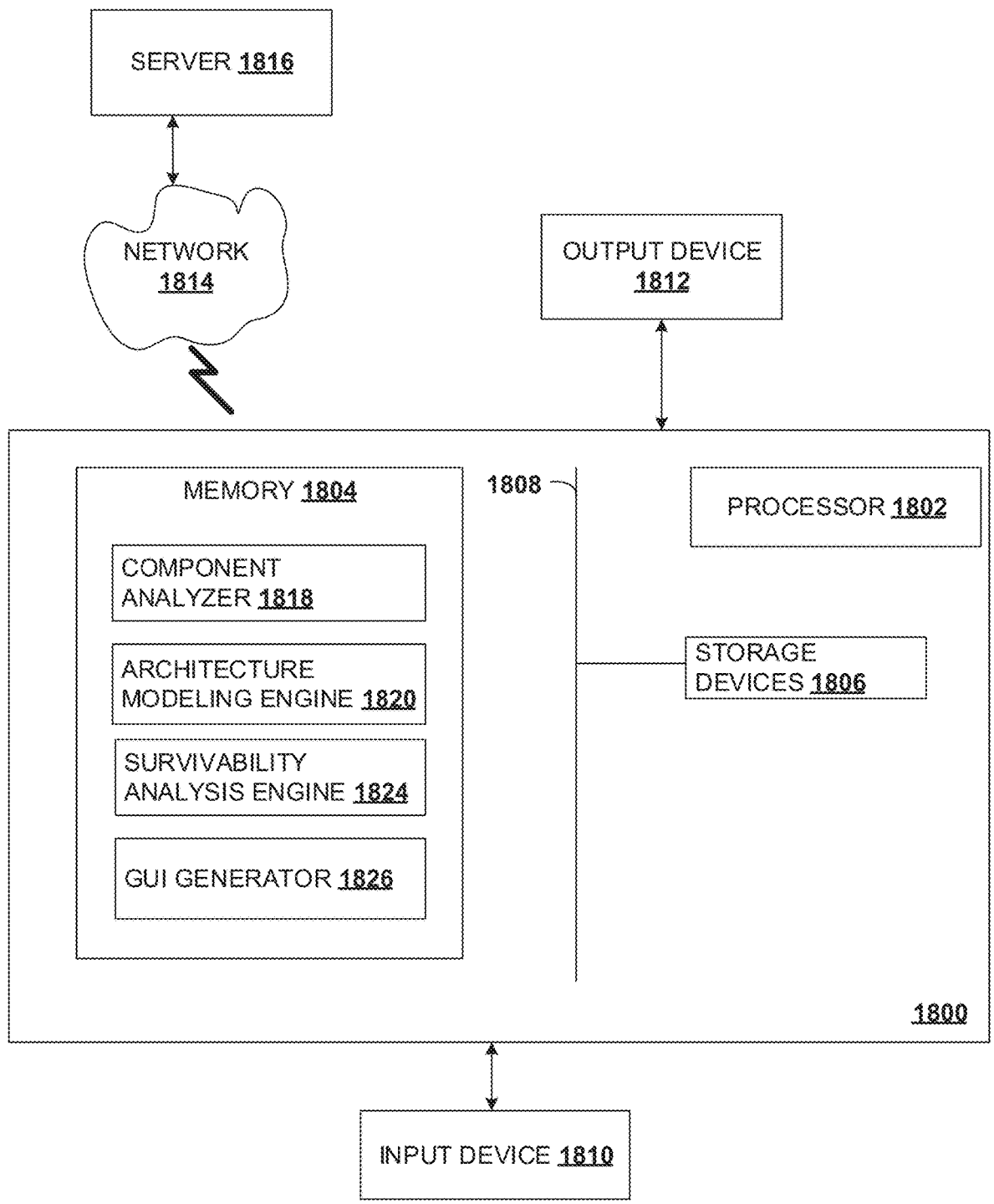
FIG. 18 illustrates an example of a computing system employable to execute analysis of target architectures for platforms for cyber vulnerabilities.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that include at least the minimum processing power, memory and input and output device(s) to perform one or more embodiments. As shown in FIG. 18, the computing system 1800 can include a computer processor 1802, memory 1804 (e.g., RAM, cache memory, flash memory, etc.), one or more storage devices 1806 (e.g., a solid state drive, a hard disk drive, an optical drive such as a compact disk (CD) drive or digital versatile disk (DVD) drive, a flash memory stick, etc.) and numerous other elements and functionalities. The computer processor 1802 may be an integrated circuit for processing instructions. For example, the computer processor 1802 may be one or more cores, or micro-cores of a processor. Components of the computing system 1800 can communicate over a data bus 1808.

The computing system 1800 may also include an input device 1810, such as any combination of one or more a touchscreen, keyboard, mouse, microphone, touchpad, electronic pen, or any other input device. The input device 1810 can be the input device 118, as shown in FIG. 1. Further, the computing system 1800 can include an output device 1812, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. The output device 1812 can be the output device 116, as shown in FIG. 1.

In some examples, such as a touch screen, the output device 1812 can be the same physical device as the input device 1810. In other examples, the output device 1812 and the input device 1810 can be implemented as separate physical devices. The computing system 1800 can be coupled to a network 1814 (e.g., a local area network (LAN), a wide area network (WAN) such as the Internet, a mobile network, or any other type of network) via a network interface (not shown). The input device 1810 and output device(s) 1818 can be coupled locally and/or remotely (e.g., via the network 1814) to the computer processor 1802, the memory 1804 and/or the storage device 1806. Many different types of computing systems exist, and the input device 1810 and the output device 1812 can take other forms.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein. The computing system 1800 can communicate with a server 1816 via the network 1814. The memory 1804 can include a plurality of applications and/or modules that can be employed to implement target architecture analysis techniques as described herein. More particularly, the memory 1804 can include a component analyzer 1818 (e.g., such as the component analyzer 120 or 200 described herein), an architecture modeling engine 1820 (e.g., such as the architecture modeling engine 124 or 300 described herein), a survivability analysis engine 1822 (e.g., such as the survivability analysis engine 136 described herein), and a GUI generator 1826 (e.g., such as the GUI generator 144 described herein).

Further, one or more elements of the computing system 1800 can be located at a remote location and coupled to the other elements over the network 1814. Additionally, some examples can be implemented on a distributed system having a plurality of nodes, where each portion of an embodiment can be located on a different node within the distributed system. In one example, the node in the example of FIG. 18 corresponds to a distinct computing device. Alternatively, the node can correspond to a computer processor with associated physical memory. The node can alternatively correspond to a computer processor or microcore of a computer processor with shared memory and/or resources.

What has been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A system comprising:
   memory to store machine-readable instructions, a part property table for one or more parts of the platform, and a connection property table for one or more connections of the platform; and
   one or more processors to access the memory and execute the machine-readable instructions, the machine-readable instructions comprising:
   a component analyzer programmed to compute:
   a respective part score for each part of the platform based on the part property table;
   a respective connection score for each connection of the platform based on the connection property table, the component analyzer programmed to provide the respective part and connection scores as score data;
   an architecture modeling engine programmed to compute a probability model based on the score data and an architecture model, the probability model comprising a part probability value and a connection probability value, and the architecture model characterizing a target architecture of the platform, the target architecture defining how the parts of the platform are to be connected in a proposed design of the platform; and
   a survivability analysis engine programmed to evaluate the probability model and the architecture model to determine a likelihood that one or more potential cyber-attacks on the platform based on the target architecture are successful or unsuccessful in compromising at least one part of the platform.

2. The system of claim 1, wherein the survivability analysis engine is programmed to generate survivability data recording a frequency that each part and connection is used for the one or more potential cyber-attacks.

3. The system of claim 1, wherein the survivability data is used to revise the target architecture for the platform to eliminate or mitigate one or cyber-attack vectors, such that the platform once implemented based on the revised target architecture exhibits improved cyber security in contrast to the target architecture based on the platform.

4. The system of claim 1, wherein the respective part score is indicative of a cyber resiliency of a respective part of the one or more parts of the platform to withstand the one or more potential cyber-attacks on the platform based on the target architecture for the platform, and
   wherein the respective connection score is indicative of a likelihood that a respective connection of the one or more connections of the platform is to be used during the one or more potential cyber-attacks on the platform based on the target architecture for the platform.

5. The system of claim 4, wherein the component analyzer is programmed to process:
   associated binary and weight values of the part property table for the respective part of the one or more parts of the platform to compute the respective part score, and
   associated binary and weight values of the connection property table for the respective connection of the one or more connections of the platform to compute the respective connection score.

6. The system of claim 5, wherein the component analyzer comprises a score calculator for computing each respective part and connection score based on the associated binary and weight values in a corresponding part and connection property table.

7. The system of claim 6, wherein the weight value assigned to a respective property of part and connection properties associated with a respective one of the one or more parts and connections has one of a positive or a negative magnitude, the weight value having the positive magnitude based on a positive characteristic of the respective one of the one more parts and connections, and the weight value having the negative magnitude based on a negative characteristic of the respective one of the one more parts and connections.

8. The system of claim 7, wherein the part property table comprises general part properties, source properties, and target properties, and the component analyzer is programmed to parse the part property table and output a partitioned part property table that includes the source and target properties for providing the architecture model.

9. The system of claim 8, wherein the machine-readable instructions further comprise a platform description generator programmed to:
cause an output device to render a respective part and connection survey on an output device, and in response to rendering a respective one of the part and connection, surveys on the output device receiving respective part and connection survey data based on a user input at an input device;
provide the part property table identifying respective part properties for the one or more parts of the platform based on the part survey data; and
provide the connection property table identifying respective connection properties for the one or more connections of the platform based on the connection survey data.

10. The system of claim 9, wherein the architecture modeling engine comprises an architecture modeling module programmed to provide the architecture model with start and end conditions indicative respectively of where the one or more potential cyber-attack begin and end with respect to the platform.

11. The system of claim 10, wherein the architecture modeling engine comprises a probability calculator programmed to provide part and component probability values based on respective part and component scores.

12. The system of claim 11, wherein the survivability analysis engine comprises a first analysis tool programmed to compute a part contribution probability value for each part of the one or more parts platform, the part contribution probability value being indicative of the respective part contribution to the one or more potential cyber-attacks.

13. The system of claim 12, wherein the survivability analysis engine comprises a second analysis tool programmed to simulate the one or more potential cyber-attacks through the architecture model to record a frequency that each part and connection is used for the one or more potential cyber-attacks.

14. A computer implemented method comprising:
generating a part property table identifying respective part properties for one or more parts of a platform based on part survey data, wherein the property table comprises respective binary and weights values associated with one of the one or more parts;
generating a connection property table identifying respective connection properties for one or more connections of the platform based on connection survey data, wherein the connection property table comprises respective binary and weights values associated with one of the one or more connections;
computing a part score for each part of the platform based on the respective binary and weight values for a respective part of the one or more parts from the part property table;
computing a connection score for each connection of the platform based on the respective binary and weight values for a respective connection of the one or more connections from the connection property table;
computing a probability model based on the part and connection scores and an architecture model, the probability model comprising a part probability value and a connection probability value, and the architecture model characterizing a target architecture of the platform, the target architecture defining how the parts of the platform are to be connected in a proposed design of the platform; and
evaluating the probability model and the architecture model to determine a likelihood that one or more potential cyber-attacks on the platform based on the target architecture are successful or unsuccessful in compromising at least one part of the platform.

15. The computer implemented method of claim 14, generating survivability data recording a frequency that each part and connection is used for the one or more potential cyber-attacks.

16. The computer implemented method of claim 15, causing the target architecture for the platform to be revised to eliminate or mitigate one or cyber-attack vectors, such that the platform once implemented based on the revised target architecture exhibits improved cyber security in contrast to the target architecture based on the platform.

17. The computer implemented method of claim 16, further comprising causing an output device to render a respective part and connection surveys on an output device, and in response to rendering a respective one of the part and connection surveys on the output device receiving the part and connection survey data based on a user input at an input device.

18. A non-transitory machine-readable medium having machine-readable instructions, the machine-readable instructions comprising:
a component analyzer comprising a score calculator programmed to compute for each part and connection of a platform a respective part and connection score;
an architecture modeling engine comprising:
a probability score calculator programmed to compute a probability model comprising a part probability value and a connection probability value for a corresponding part and connection of the platform based on the respective part and connection score;
an architecture modeling module programmed to provide an architecture model with start and end conditions indicative respectively of where at least one potential cyber-attack begins and ends with respect to the platform based on architecture description data characterizing a target architecture of the platform, the target architecture defining how the parts of the platform are to be connected in a proposed design of the platform, and start and end condition data; and
a survivability analysis engine programmed to evaluate the probability model and the architecture model to determine a likelihood that one or more potential cyber-attacks are successful or unsuccessful in compromising the at least one part of the platform.

19. The non-transitory machine-readable medium of claim 18, wherein the survivability analysis engine is programmed to generate survivability data recording frequency that each part and connection is used for the one or more potential cyber-attacks.

20. The non-transitory machine-readable medium of claim 19, wherein the survivability data is used to revise the target architecture for the platform to eliminate or mitigate one or cyber-attack vectors, such that the platform once implemented based on the revised target architecture exhibits improved cyber security in contrast to the target architecture based on the platform.

* * * * *